US008381791B2

(12) United States Patent
Corghi

(10) Patent No.: US 8,381,791 B2
(45) Date of Patent: Feb. 26, 2013

(54) DEVICE FOR LIFTING A BOTTOM SIDE WALL OF A TYRE IN A TYRE REMOVING MACHINE

(75) Inventor: Giulio Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 245 days.

(21) Appl. No.: 12/909,445

(22) Filed: Oct. 21, 2010

(65) Prior Publication Data

US 2011/0100559 A1     May 5, 2011

(30) Foreign Application Priority Data

Nov. 3, 2009   (IT) .............................. BO2009A0722

(51) Int. Cl.
*B60C 25/132*     (2006.01)
(52) U.S. Cl. ...................................... 157/1.24; 157/1.17
(58) Field of Classification Search .................. 157/1.24, 157/1.17, 1.26; 29/426.5
See application file for complete search history.

(56) References Cited

U.S. PATENT DOCUMENTS

| 3,008,512 | A | 11/1961 | Foster | |
| 6,422,285 | B1 * | 7/2002 | Gonzaga | 157/1.24 |
| 6,880,606 | B2 * | 4/2005 | Gonzaga | 157/1.28 |
| 7,946,016 | B2 * | 5/2011 | Giovannucci et al. | 29/426.5 |
| 2005/0274461 | A1 * | 12/2005 | Corghi | 157/1.17 |
| 2008/0010804 | A1 * | 1/2008 | Giovannucci et al. | 29/426.5 |

FOREIGN PATENT DOCUMENTS

| EP | 0243785 A2 | 11/1987 |
| EP | 0499825 A1 | 8/1992 |
| EP | 1155880 A2 | 11/2001 |

* cited by examiner

*Primary Examiner* — David B Thomas
(74) *Attorney, Agent, or Firm* — Pearne & Gordon LLP

(57) ABSTRACT

A device for lifting the bottom side wall (7b) of the tire (7) in a tire removing machine comprises a frame (10), an arm (16) rotatably associated with the frame (10) at a first end of it (16a) to rotate between an angular rest position and an angular working position. A supporting element (18) is connected to a second end (16b) of the arm (16) to support a bottom side wall (7b) of a tire (7) when the arm (16) is in the working position. The device also comprises an arm (16) rotation stop member (20) operatively positioned between the arm (16) and the frame (10) and able to be activated to prevent the arm (16) from turning relative to the frame (10) at least at the angular working position.

16 Claims, 6 Drawing Sheets

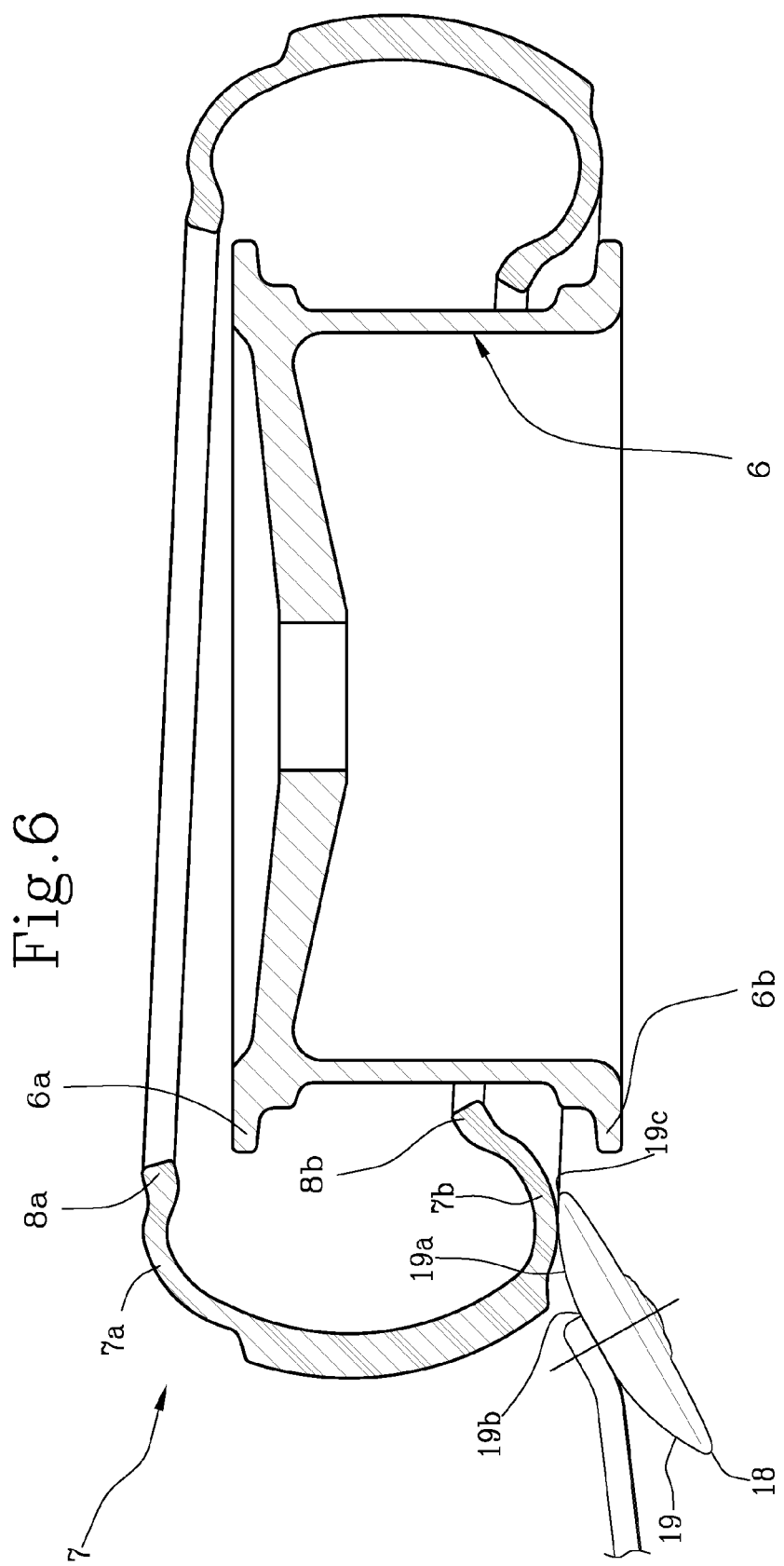

DEVICE FOR LIFTING A BOTTOM SIDE WALL OF A TYRE IN A TYRE REMOVING MACHINE

BACKGROUND OF THE INVENTION

This invention relates to a device for lifting a bottom side wall of a tyre in a tyre removing machine (in particular in a tyre removing machine where the tyre to be removed is positioned with its axis vertical).

The invention also relates to a tyre removing machine comprising this device.

The invention also relates to a method for removing tyres from wheels in a tyre removing machine comprising this device.

This invention can therefore be applied in the technical field of apparatus for mounting and, more specifically, for removing the tyres of automobiles, motorcycles, or other vehicles, from the respective wheel rims.

This specification refers only to the tyre removal procedure since the device according to the invention applies essentially to the step of taking the tyre off the rim.

More specifically, the invention relates to the procedure for extracting the bottom portion (that is, the bottom bead) of a tyre from the rim in a tyre removing machine adapted to support the wheel concerned with its axis extending vertically.

In light of this, prior art tyre removal machines comprise a horizontal turntable on which the wheel is positioned in such a way that its central axis is substantially vertical.

In this specification, the term wheel is used to mean an assembly of a tyre and a rim.

Once positioned on the turntable, the tyre has a bottom side wall facing the turntable itself and a top side wall facing upwards.

Each of the two side walls comprises a bead, that is to say, the reinforced edge of the tyre in contact with the rim.

The bead of the top side wall will hereinafter be referred to as the top bead and, similarly, the bead of the bottom side wall will hereinafter be referred to as the bottom bead.

In the same way, the rim edge which, once the tyre has been mounted, is in contact with the top bead will hereinafter be referred to as the top edge, while the edge that is in contact with the bottom bead will hereinafter be referred to as the bottom edge.

The removal procedure comprises a bead loosening step, that is, a step of disengaging the beads from the rim, and a step of positioning and locking the wheel on the turntable. This is followed by a step of extracting the tyre, where the top bead and the bottom bead are disengaged from the rim, enabling the tyre to be removed completely.

Prior art devices for pressing the beads of a tyre comprise two operating units, each acting on a respective side wall of the tyre in order to separate it from the edge of the rim.

This allows a tool to be inserted between the respective bead and the rim in a working step (where the wheel is made to rotate about its axis).

More specifically, a top operating unit acts on the top bead during both the mounting and the removal procedure, while a bottom operating unit acts on the bottom bead only during the removal procedure.

In particular, the top operating unit is used to push the top side wall of the tyre downwards in such a way as to create a space between the top edge of the rim and the top bead of the tyre to facilitate insertion of the removing tool.

Further, the top operating unit is used to keep the top bead of the tyre inside a suitable groove formed in the rim, commonly known as channel, and to reduce stress on the bead during mounting and removal.

The bottom operating unit is activated during tyre removal.

More specifically, the bottom operating unit is used after the top bead has been extracted.

More in detail, the bottom operating unit is used to lift the tyre until the bottom bead of the tyre is near the top edge of the rim.

Since that operating unit is used to lift the tyre, it will be referred to as lifting device.

In detail, a prior art lifting device for lifting the bottom side wall of a tyre typically comprises an arm pivoted to the frame of the tyre removing machine and designed to be moved by an operator between a rest position, where the arm is distal from the tyre, and an operating position, where the arm is proximal to the tyre.

There is also a disc rotatably associated with the end of the arm opposite the end that is pivoted to the frame of the tyre removing machine.

The disc lies in a substantially horizontal plane so that when the arm is in the operating position the disc is positioned under the bottom side wall of the tyre.

When the arm is in the operating position, since it is movable vertically, the disc, which is held in place manually by an operator, presses against the tyre's bottom side wall, thus lifting the bottom bead from the rim and allowing a removing tool to be inserted between the bottom bead itself and the top edge of the rim.

Prior art devices also have a metal bar that can be engaged with the arm of the lifting device at a recess formed in the arm itself so that the leverage effect can be used to facilitate the operator's task of pushing the arm against the tyre.

Disadvantageously, however, an operator using a prior art device needs both hands to press the arm of the device against the tyre and at the same time keep the tyre in place on the turntable (by acting manually on the outer portion of the tyre's circumference at a position diametrically opposite the side wall lifting disc).

This disadvantage is worsened especially when the tyre to be removed is very large since the two hands have to work on substantially opposite sides of the tyre.

Moreover, the use of the metal bar as described, is not only extremely awkward for the operator but is also potentially dangerous.

A technical solution is known from document EP1155880, that shows a machine for mounting and dismounting tyres of motor vehicle wheels, which comprises a frame rigidly connected to a support, rotating around a vertical axis, on which can be fixedly placed a rim of the wheel.

Said machine further comprises a couple of telescopic arms, a lower one and an upper one, connected to the frame and both rotatable around respective horizontal axis in order to respectively approach or move away.

The machine according to this solution allows to set the angle of the arms using hydraulic or pneumatic means in order to adapt the position of a tool to a tyre bead.

A further solution is known from document EP0499825.

This solution is similar to the previous one but it further shows the telescopic arms rotating around an axis parallel the wheel axis.

However, in this solution the arms have to be kept in the right angular position from the user by hand, introducing all the drawbacks previously discussed.

A different solution is shown in document EP0243785, that shows a machine for mounting and dismounting tyres of motor vehicle wheels, having a rotating support on which can be placed a wheel with its axis in a vertical position.

The rotating support is placed below a bridge shaped frame, which has a crosspiece on which is mounted a couple of arms.

Said arms are movable in mutual approach or separation around respective horizontal axis.

Moreover, a linear actuator is active on the rotating support for moving it upwardly or downwardly in order to press or lift the tyre bead.

However, this solution is clearly bulky and difficult to realize since it needs a lot of free space to place the bridge shaped frame.

SUMMARY OF THE INVENTION

This invention therefore has an object to propose a lifting device to be used in a tyre removing machine and a tyre removing machine comprising the device that overcome the above mentioned disadvantages of the prior art.

More specifically, it is an object of this invention to provide a lifting device to be used in a tyre removing machine and a tyre removing machine comprising the device that are safe and easy to use for the operator.

The object specified is achieved by a lifting device to be used in a tyre removing machine and a tyre removing machine comprising the device whose technical features are set out in one or more of the appended claims.

In particular, the device according to the present invention comprises:
  a frame;
  an arm rotatably associated with the frame at a first end of the arm to rotate around an axis parallel to the wheel axis between an angular rest position and an angular working position;
  a supporting element connected to a second end of the arm and designed to interact with the bottom side wall of the tyre, in order to lift it, when the arm is in the working position.

According to the invention, the device comprises an arm rotation stop member configured to hold the arm in place at a certain angular position relative to the frame at least when it is at the angular working position and to impede the arm rotation around said axis.

Preferably, according to the invention, the arm rotation stop member comprises a brake.

BRIEF DESCRIPTION OF THE DRAWINGS

Further features and advantages of the invention are more apparent in the non-limiting description which follows of a preferred but non-exclusive embodiment of a device for lifting a bottom side wall of a tyre in a tyre removing machine and a tyre removing machine comprising the device, as illustrated in the accompanying drawings, in which:

FIG. 6 illustrates a detail of the device of FIG. 1 in a working position, in cross section.

DESCRIPTION OF THE PREFERRED EMBODIMENTS

Figure 1:
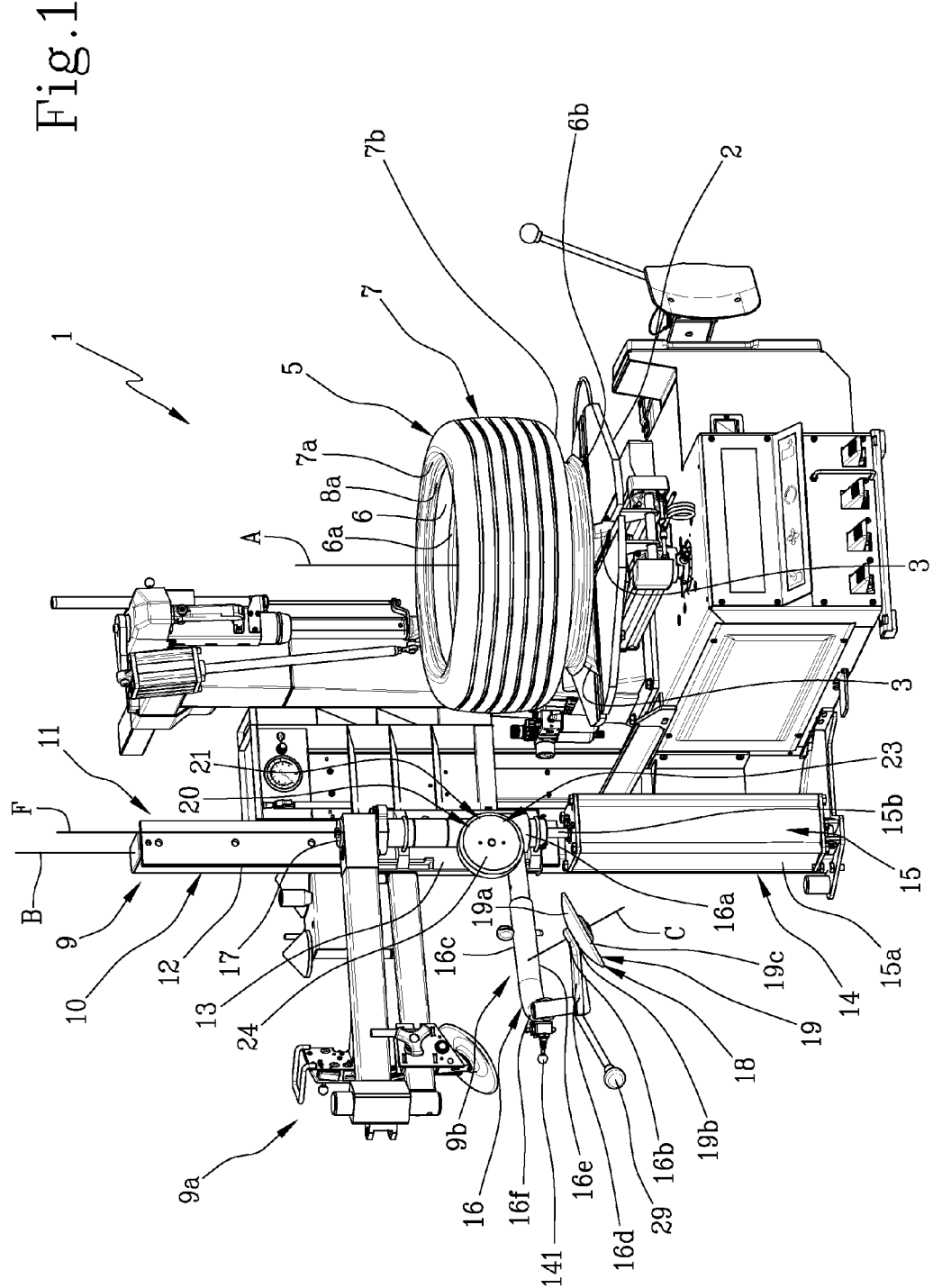
FIG. 1 is a perspective view of a tyre removing machine comprising a lifting device according to this invention, in a rest configuration.
Figure 2:
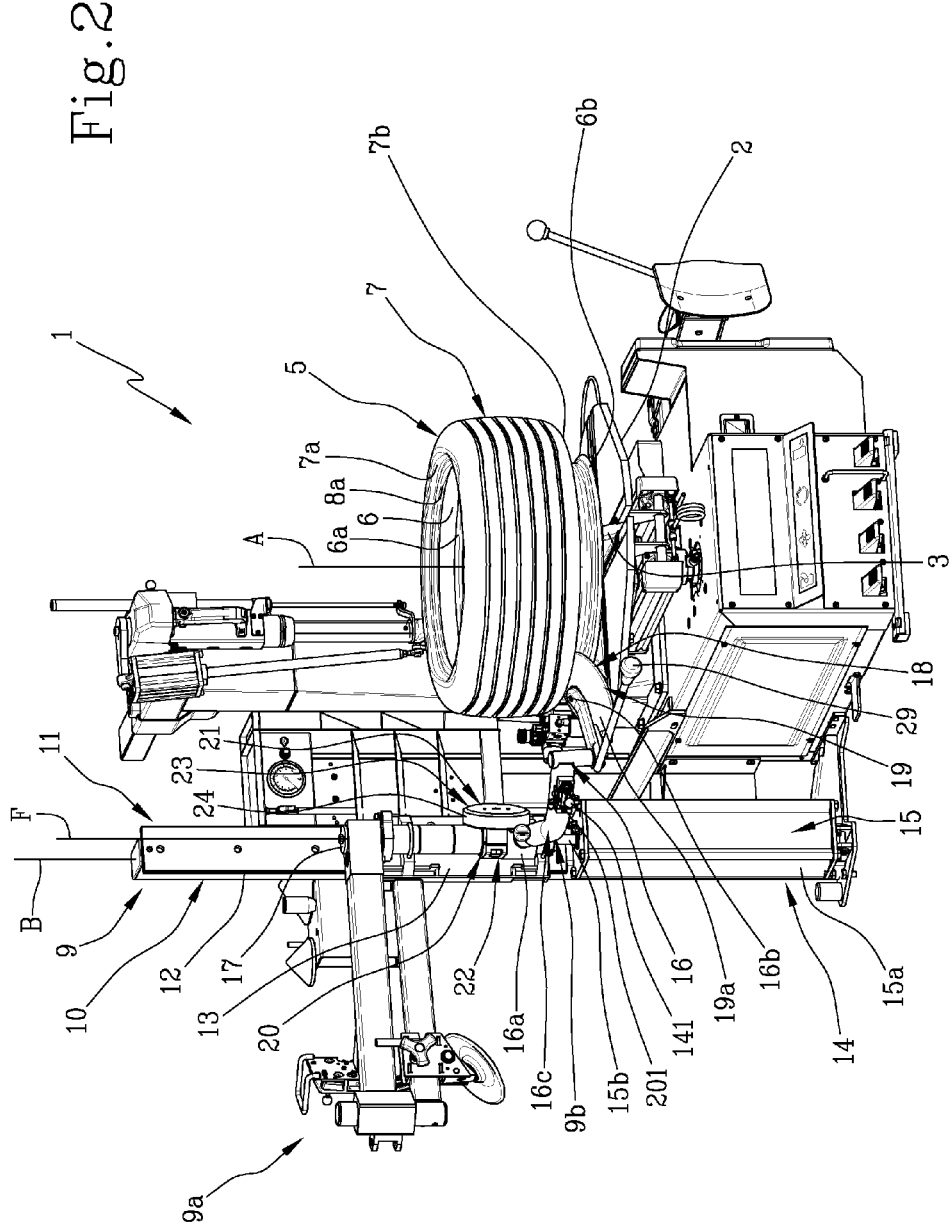
FIG. 2 is a perspective view of the tyre removing machine of FIG. 1 comprising the lifting device in a working configuration.
Figure 3:
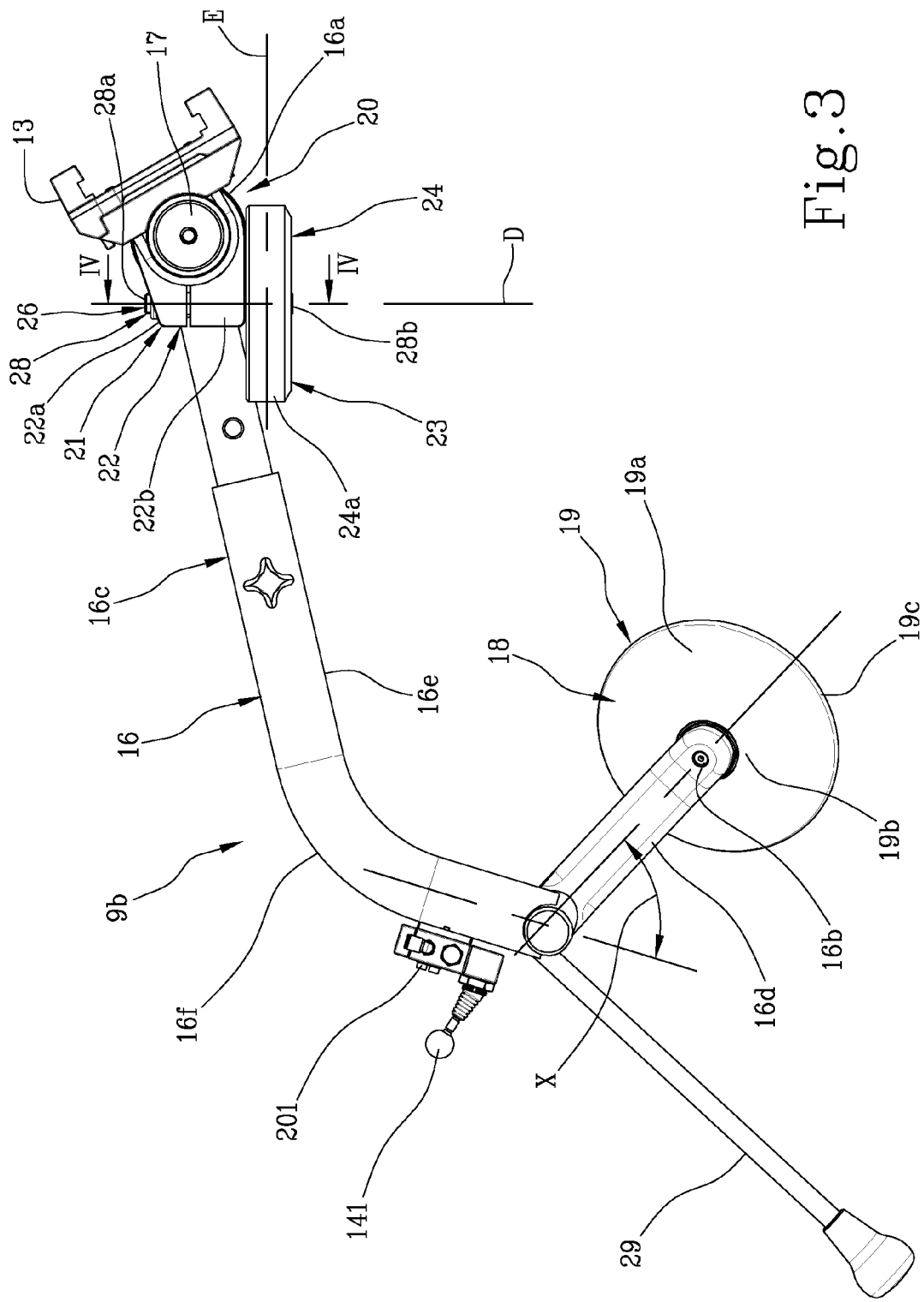
FIG. 3 is a top view of a detail of a lifting device according to the invention.
Figure 4:
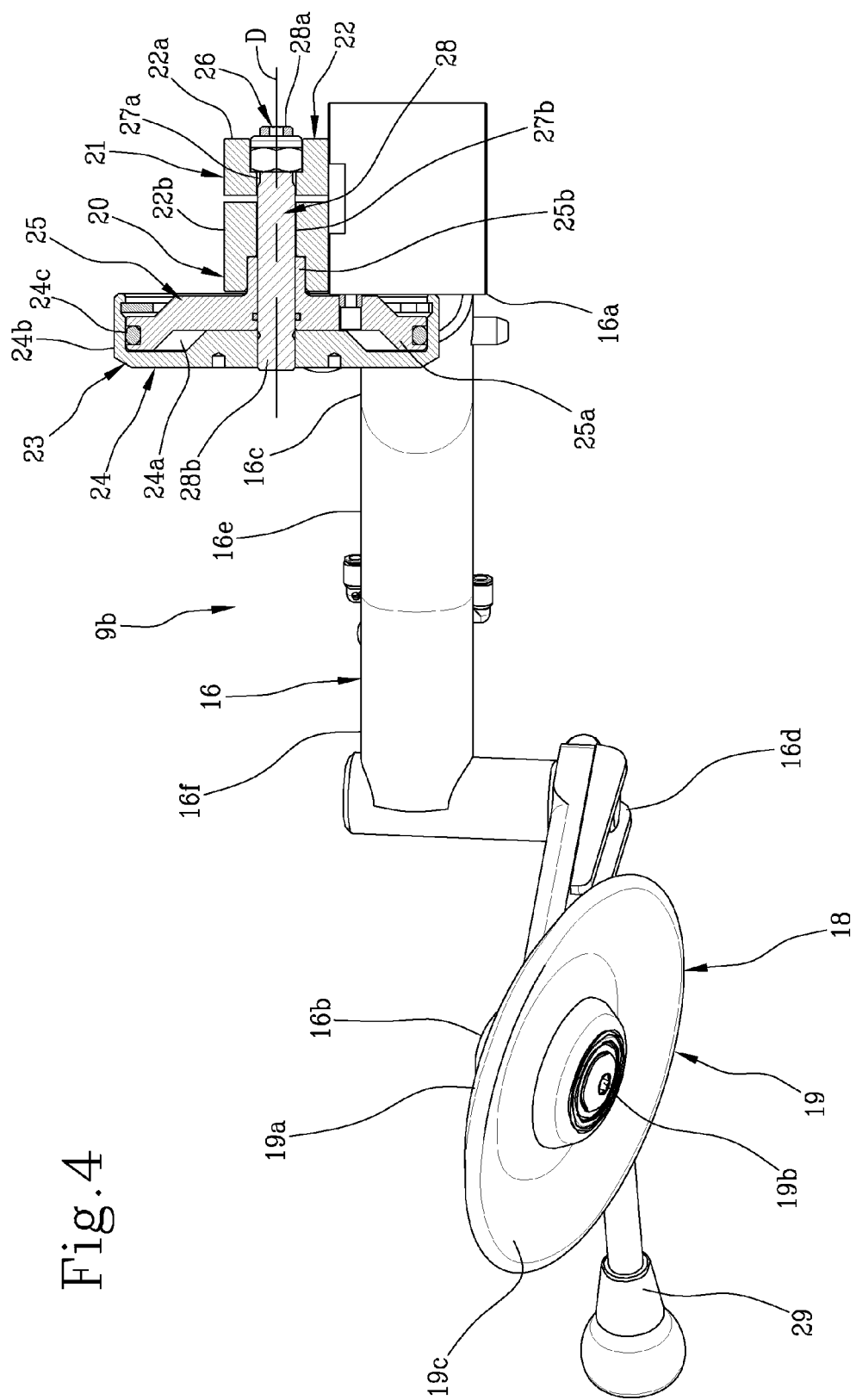
FIG. 4 is a cross sectional view of the detail of FIG. 3 along the section line IV-IV of FIG. 3.
Figure 5:
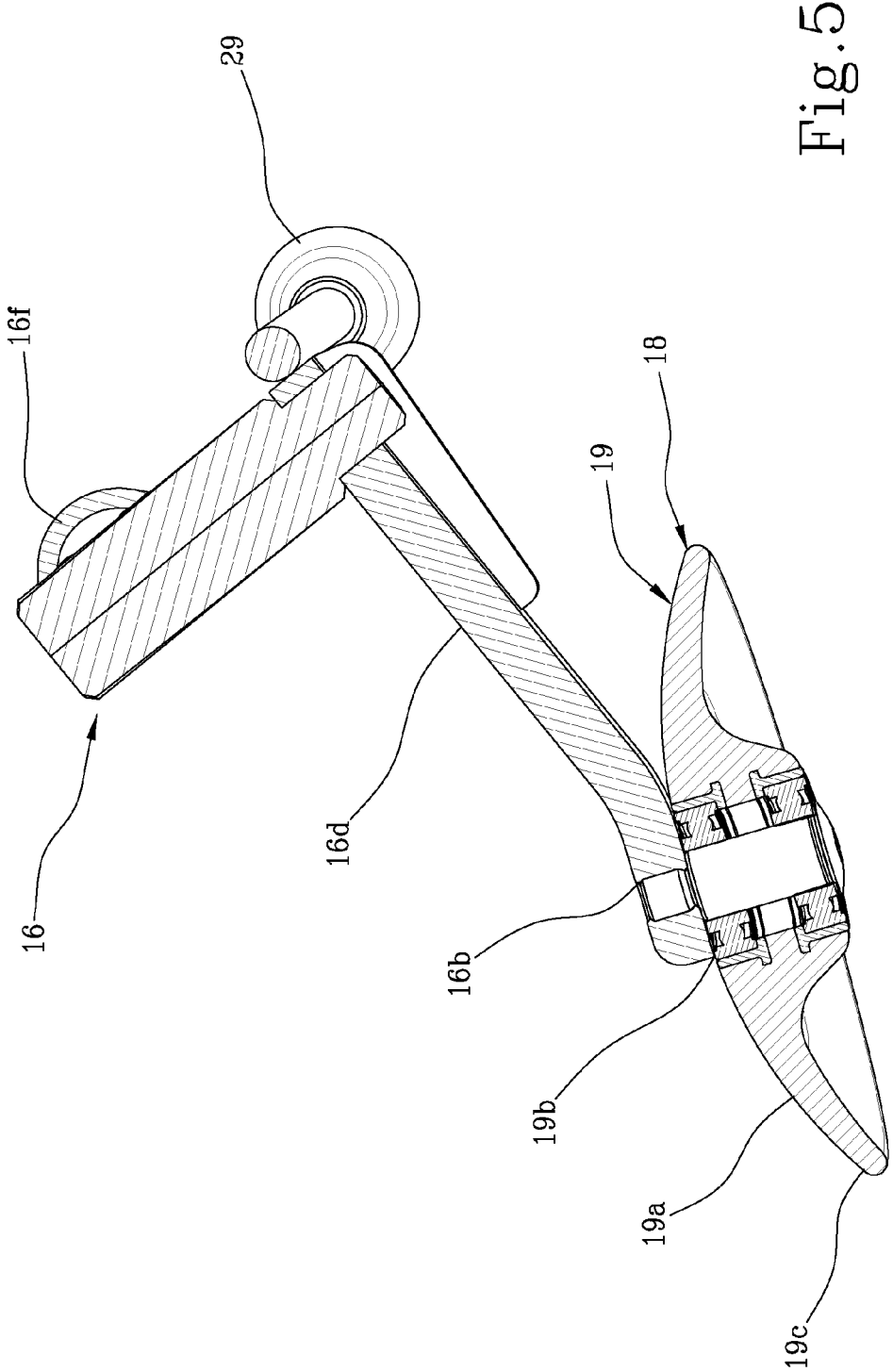
FIG. 5 is a cross sectional view of the detail of FIG. 3 along the section line V-V of FIG. 3.

With reference to the accompanying drawings, the numeral 1 denotes a tyre removing machine according to the invention.

The tyre removing machine 1 comprises a substantially horizontal turntable 2 that revolves about its axis of rotation "A".

In the embodiment illustrated, the axis of rotation "A" of the turntable 2 is substantially vertical.

The turntable 2 has a plurality of fastening portions 3 for holding a wheel 5, spaced at equal angular intervals and whose radial distance from the axis "A" is adjustable according to the size of the wheel 5.

The wheel 5 is defined by the assembly of a rim 6 and a tyre 7 mounted on the rim 6.

Also, the wheel 5 has a central axis that adopts an orientation parallel to the axis of rotation "A" of the turntable 2 on which the wheel 5 rests.

In the preferred embodiment, the central axis of the wheel 5 coincides with the axis of rotation "A" of the turntable 2.

When the wheel 5 is positioned on the turntable 2, the tyre 7 has a bottom side wall 7b facing the turntable 2 and a top side wall 7a facing the direction opposite the bottom side wall 7b.

Each of the two side walls 7a, 7b comprises a bead 8a, 8b, that is to say, the reinforced edge of the tyre 7 in contact with an abutment zone 6a, 6b of the rim. 6 The bead 8a of the top side wall 7a will hereinafter be referred to as the top bead 8a and, similarly, the bead of the bottom side wall 7b will hereinafter be referred to as the bottom bead 8b.

The rim edge corresponding to the top bead 8a will hereinafter be referred to as the top edge 6a and, similarly, the edge corresponding to the bottom bead 8b will hereinafter be referred to as the bottom edge 6b.

When the tyre 7 is mounted on the rim 6, each of the beads 8a, 8b is in contact with a respective abutment zone 6a, 6b.

In order to facilitate tyre 7 removal, the tyre removing machine 1 comprises a lifting device according to this invention, which raises the bottom side wall 7b of the tyre 7.

It should be noted that in the example illustrated, the device for lifting the side wall 7b is part of a bead-pressing device 9 adapted to lower the top side wall 7a of the tyre in addition to lifting the bottom side wall 7b of the tyre 7.

The device for lifting the bottom side wall 7b of the tyre 7 (that is, the bead-pressing device 9) comprises a substantially longitudinal frame 10 extending along a principal axis of extension "B".

Preferably, the principal axis of extension "B" is vertical (that is, directed substantially in the direction of application of the weight force).

In other words, the principal axis of extension "B" is parallel to the axis of rotation "A" of the turntable 2.

In the embodiment illustrated, the frame 10 comprises a vertical turret 11 on which a guide 12 is mounted.

The guide 12 extends along the principal axis of extension "B" of the turret 11.

A carriage 13 is slidably constrained to the guide 12 in order to move up or down in the guide 12.

Means 14 for moving the carriage 13 operate between the turret 11 and the carriage 13 to move the carriage 13 along the guide 12.

Thus, the lifting device comprises movement means 14 designed to move the carriage 3 up and down.

More specifically, the movement means 14 comprise a piston 15, preferably hydraulic or pneumatic.

In the embodiment illustrated, the piston 15 comprises a liner 15a and a slider 15b that slides in the liner 15a and is connected to the carriage 13.

In particular, the liner 15a is integral with the frame 10.

The slider 15b is a longitudinal cylindrical element that slides in the liner 15a along the principal axis of extension "B" of the frame 10.

The bead-pressing device 9 comprises a top operating unit 9a and a bottom operating unit 9b.

In light of this, the device for lifting the bottom side wall 7b of the tyre 7 is labelled 9b in the drawings.

The top operating unit 9a operates on the top side wall 7a of the tyre 7 during the mounting and removal procedures.

The bottom operating unit 9b operates on the bottom side wall 7b of the tyre 7 during the removal procedure.

In the embodiment illustrated, both the top operating unit 9a and the bottom operating unit 9b are connected to the frame 10.

More specifically, the bottom operating unit 9b is mounted on the carriage 13 in such a way as to slide in the guide 12.

That way, the bottom operating unit 9b can vary its height.

Said bottom operating unit 9b comprises an arm 16 having a first end 16a and a second end 16b opposite the first end 16a.

The first end 16a of the arm 16 is rotatably associated with the frame 10 (in particular, it is connected to the carriage 13) to enable the arm 16 to rotate between an angular rest position and an angular working position.

An axis of rotation "F" of the arm 16 is parallel with the principal axis of extension "B" of the turret 11.

At the angular rest position, the arm 16 is distal from the turntable 2 and, hence, from the tyre 7.

At the angular working position, the arm 16 is at least partly proximal to the turntable 2 and, hence, to the tyre 7.

More specifically, at the angular working position, the second end 16b of the arm 16 is proximal to the turntable 2.

The frame 10 comprises a pin 17 to which the first end 16a of the arm 16 is pivoted to allow rotation between one position and the other.

In the embodiment illustrated, the pin 17 is integral with the cursor 15b of the piston 15.

Further, the pin 17 is fixed to the carriage 13 and, consequently, is moved by the slider 15b along the guide 12.

By turning about the pin 17, the arm 16 turns about the frame 10.

A supporting element 18 is connected to the second end 16b of the arm to support the bottom side wall 7b of the tyre 7.

Thus, the arm 16 movement means 14, which the lifting device 9b is equipped with, are adapted to lift the supporting element 18 from a lowered position to a raised position where it operates on the bottom side wall 7b of the tyre in order to lift it.

In use, the supporting element 18 is located under the bottom side wall 7b when the arm is at the angular working position.

The piston 15 is activated and lifts the arm 16.

That way, the supporting element 18 is pushed towards the bottom side wall 7b of the tyre 7.

The bottom side wall 7b of the tyre 7 is thus lifted by the supporting element 18 (until the tyre's bottom bead 8b comes into contact with the top edge 6a of the rim 6). The pushing action of the linear actuator 15 deforms the bead 8b which moves upwards away from the rim 6, enabling an operator to insert a removing tool between the tyre 7 and the rim 6.

More specifically, at this stage, the removing tool is inserted between the bottom bead 8b and the top edge 6a.

In the embodiment illustrated, the arm 16 has a starting portion 16c that extends away from the first end 16a.

More specifically, the starting portion 16c comprises a straight section 16e, proximal to the first end 16a, and a curved portion 16f distal from the first end 16a.

The arm 16 also comprises an ending portion 16d located at a lower level than, and inclined at an angle "X" to, the starting portion 16c.

Advantageously, this allows the operator to minimize the effort required to place the arm 16 correctly in the working position.

In effect, this allows the second end 16b, and hence the supporting element 18, to be directed towards the turntable 2 when the arm 16 is in the working position.

Further, the arm 16 preferably also has a telescopic structure to enable it to adapt the device for lifting the bottom side wall 7b of the tyre 7 to tyre removing machines 1 of different sizes or tyres 7 of different sizes.

More preferably still, the starting portion 16c of the arm 16 has a telescopic structure.

In the preferred embodiment, the supporting element 18 comprises a disc shaped member 19 pivoted to the second end 16b of the arm 16.

Advantageously, the presence of a revolving disc shaped member 19 enables the bottom unit 9b of the bead-pressing device 9 to be held in position even when the turntable 2 is turning the wheel 5.

Indeed, by turning with the tyre 7, the disc shaped member 19 revolves without scraping on the bottom side wall 7b of the tyre 7, thus preventing damage to it.

The disc shaped member 19 has a central portion 19a hinged to the arm 16, and a peripheral portion 19b. Preferably, the disc shaped member 19 has a convex surface 19c and an axis of rotation "C" inclined at an angle to the vertical in such a way that the part of the peripheral portion 19b on which the bottom side wall 7b of the tyre 7 rests is substantially horizontal.

In other words, when the arm 16 is at the angular rest position, the axis of rotation "C" of the disc shaped member 19 is oriented in such a way as to be directed towards the turntable 2.

Advantageously, the shape of the disc shaped member 19 facilitates lifting of the tyre 7 and positioning of the disc shaped member 19 itself under the bottom side wall 7b. The shape of the disc shaped member 19 also facilitates relieving of mechanical strain applied to the disc, making the disc itself particularly resistant.

According to the invention, the device 9 for lifting the bottom side wall 7b of the tyre 7 also comprises a rotation stop member 20 operatively positioned between the arm 16 and the frame 10 and designed to stop the arm 16 from turning.

Preferably, the stop member 20 can be activated by an actuator (for example a pneumatic actuator), through a controlling element 201 (for example a switch or other preferably bistable control) associated with the frame and easy for the operator to access.

The device also comprises a control element 141 for controlling the arm 16 movement means (in order to move the arm up and down vertically).

Preferably, the control element 201 for controlling the stop member 20 is associated with the frame 10 (and still more preferably to the arm 16) in the proximity of the control element 141 that controls the movement means 14 of the lifting device. Preferably, the control element 141 that controls the movement means is a monostable pushbutton or actuating lever.

The stop member 20 is designed to lock in the stop position until the operator acts on the control element to unlock the stop member and allow the arm to turn.

The stop member 20 can be activated to prevent the arm 16 from turning relative to the frame 10 at least at the angular working position.

Preferably, the stop member can be activated to prevent the arm 16 from turning relative to the frame 10 at any angular working position.

In the embodiment illustrated, the stop member 20 comprises a brake 21.

Preferably, the brake 21 is mounted integrally with the arm 16.

More preferably, the brake 21 is designed to be engaged with the frame 10.

More precisely, the brake 21 is mounted integrally with the first end 16a of the arm 16 and is designed to be engaged with the pin 17.

By brake 21 is meant a mechanism that allows the relative movement between two moving bodies to be stopped by creating a frictional force between them.

Advantageously, this allows the arm 16 to be made to stop turning relative to the frame 10 at any angular position desired by the operator, making it easier to remove tyres of any diameter.

In the embodiment illustrated, the brake 21 comprises a clamp 22 placed at least partly around the pin 17.

In the embodiment illustrated, the clamp 22 is engaged with the arm 16 and held tightly as one with it.

Preferably, the clamp 22 is engaged with the arm 16 by means of an engagement tooth (not illustrated).

The clamp 22 can be selectively changed over between an open configuration, where it is disengaged from the pin 17, and a closed configuration, where it is tightened round the pin 17 to prevent the arm 16 from turning.

It should be noted that the two bodies moving relative to each other forming the brake 21 are the clamp 22 and the pin 17.

In effect, when the clamp 22 is in the open configuration, the clamp 22 can rotate relative to the pin 17 without friction between them.

When the clamp 22 is in the closed configuration, it tightens round the pin 17 applying pressure such as to create a frictional force that prevents it from rotating relative to the pin 17 and holds the two together.

In the embodiment illustrated, the clamp 22 comprises a first jaw 22a and a second jaw 22b associated with the first 22a.

More in detail, the first jaw 22a and the second 22b are made as a single part and form a single body.

The first jaw 22a and the second jaw 22b face each other at least partly so they can be moved towards each other in order to change the clamp 22 over from the open configuration to the closed configuration.

To change the clamp 22 over from one configuration to the other, the stop member 20 comprises a linear actuator 23.

Preferably, the linear actuator 23 is of the hydraulic or pneumatic type and acts on the second jaw 22b in such a way as to move it towards the first jaw 22a.

The linear actuator 23 comprises a containment body 24 having a cavity 24a within which a plunger 25 slides along a working axis "D".

In the embodiment illustrated, the working axis "D" is perpendicular to the axis of rotation "F" of the arm 16.

The plunger 25 operates on the clamp 22 in such manner as to change it over from the open configuration to the closed configuration.

More specifically, the plunger 25 operates on the second jaw 22b in such a way as to move it towards the first jaw 22a.

More specifically, the plunger 25 has a flange 25a that is at least partly shaped to match the cavity 24a and a portion 25b that is smaller in diameter than the flange 25a.

The portion 25b can be connected to the second jaw 22b to push it towards the first jaw 22a.

The containment body 24 has an outside wall 24b and an inside wall 24c that are substantially cylindrical in shape.

The inside wall 24c of the containment body 24 forms a cavity 24a within which the plunger 25 slides.

In the preferred embodiment, the containment body 24 extends mainly in a plane "E" transversal to the working axis "D" of the plunger 25.

More specifically, the containment body 24 is substantially in the shape of a disc.

In other words, the shape of the containment body 24 is such that the latter's diameter, which constitutes its transversal dimension, is much greater than its longitudinal dimension along the working axis of the linear actuator 23.

Advantageously, this enables the dimension of the actuator 23 along the working axis "B" to be minimized, thus reducing overall size.

Preferably, the actuator is a pneumatic actuator.

In the embodiment illustrated, the linear actuator 23 is mounted in projecting fashion on the clamp 22. More specifically, a supporting member 26 of the actuator 23 keeps the actuator 23 aligned with the first and second jaws 22a and 22b.

In this configuration, the linear actuator 23 faces the second jaw 22b which, as stated, faces the first jaw 22a.

In the embodiment illustrated, the first jaw 22a and the second 22b each have a slot 27a, 27b in them. The slot 27a in the first jaw 22a is opposite the slot 27b in the second jaw 22b in such a way that the supporting member 26 of the actuator 23 can be inserted between the two, protruding from the second jaw 22b to enable the actuator 23 to be fixed.

Advantageously, the supporting member 26 of the actuator 23 acts as a stop that keeps the distance between the first jaw 22a and the containment body 24 fixed.

The plunger 25 can move within this distance in order to move the second jaw 22b closer to the first jaw 22a.

In the embodiment illustrated, the supporting member 26 comprises a pin 28 that extends between the two slots 27a, 27b and is connected to the containment body 24.

In more detail, the pin 28 has a first end 28a fixed to the first jaw 22a and a second end 28b, opposite the first end 28a, fixed to the containment body 24.

The second jaw 22b and the plunger 25 are slidably engaged between the first end 28a and the second 28b of the pin 28.

Preferably, the plunger 25 is a hollow body slidable over the pin 28 that runs through it.

The pin 28 therefore constitutes a connection between the containment body 24 and the first jaw 22a and also acts as a guide for the plunger 25 and second jaw 22b.

Consequently, the pin 28 extends along the working axis "D" of the linear actuator 23.

It should be noted that the small dimension of the actuator 23 along the working axis "B" makes it possible to minimize the bending stress on the supporting member 26.

The device for lifting the bottom side wall 7b of the tyre 7 also comprises a handgrip lever 29 fixed integrally to the arm 16 and extending away from the arm 16 to allow an operator to move the arm 16 between the angular rest position and the angular working position.

Advantageously, this enables the operator to move the arm 16 against the tyre 7 and to push it to the desired position safely and conveniently.

The invention achieves the above mentioned object and has important advantages.

In effect, the presence of a stop member allows the operator to take one hand off the tyre removing machine, making operations easier and safer, particularly in light of the fact that several of the controls used during tyre removal are hand-operated.

Further, the fact that the stop member is a brake guarantees, in combination with its form, that the operator has the possibility of stopping the arm at any angular position.

Further still, the fixed handgrip lever allows the operator to operate the arm safely and without the problems created by the prior art devices.

Moreover, the shape and orientation of the disc shaped member make it possible to optimize the tyre lifting procedure, reducing the stress that tends to move it away from the disc shaped member when the tyre is turning.

Below is a description of the operation of the device according to the invention.

Operatively, the removal of a tyre is performed in the following steps:

loosening the top bead 8a from the top edge 6a;
loosening the bottom bead 8b from the bottom edge 6b;
positioning the wheel 5 on the supporting means 2;
fastening the wheel using the fastening means 3;
positioning the top unit of the bead-pressing device 9 at the top side wall 7a of the tyre 7;
operating the top unit of the bead-pressing device so as to press the top side wall 7a of the tyre downwards in such a way as to create the space necessary to insert the removing tool between top bead 8a and the top edge 6a and then hold the bead in place within the rim 6;
driving the removing tool (in a known manner);
turning the wheel until the top bead 8a comes free of the rim;
positioning the lifting device at the bottom side wall 7b (by turning the arm 16);
angularly locking the lifting device (that is, the arm 16), at a desired angular position where at least a portion of the supporting element 18 is positioned under the bottom side wall 7b of the tyre and is vertically aligned with it;
raising the arm 16 in order to lift the bottom side wall 7b by means of the lifting device;
driving the removing tool between the bottom bead 8b and the top edge 6a in a known manner;
turning the wheel until the tyre 7 is completely free of the rim 6.

It should be noted that in a variant of the operation described above, the bead loosening step is performed after fastening the wheel to the supporting means 2. This invention therefore also provides a method for removing a tyre 7 of a wheel 5 from a respective rim 6, comprising the following steps:

positioning the wheel 5 on, and fastening it to, the supporting means 2 in such a way that its axis is vertical;
lifting a bottom side wall 7b of the tyre 7 using a supporting element 18 connected to an arm 16 rotatably associated with a frame 10 of the tyre removing machine to allow a tool to be inserted between a bottom bead of the tyre and the rim;
turning the wheel about said axis in order to extract the bottom bead from the rim.

Said lifting step in turn comprises the following sub-steps:
turning the arm from a rest position, where the supporting element 18 is in a position of non-interference clear of the tyre, to a working position, where the supporting element 18 has at least one portion under the bottom side wall 7b of the tyre 7;
moving the supporting element 18 upwards.

According to the invention, the lifting step comprises a further sub-step, intermediate between the turning and movement steps, of stopping the rotation of the arm when the latter is at the working position (or at any other desired angular position) in such a way as to prevent angular movements of the arm until the stopping step is terminated.

Advantageously, this allows the operator to keep one hand on the part of the tyre that is diametrically opposite the supporting element 18, so as to hold the tyre in the correct position, while the other hand is free to drive an actuator used to lift the arm and to control the pushing action of the supporting element 18 on the bottom side wall of the tyre in such a way as to lift it.

Said procedure is simple and practical for tyres of any size.

What is claimed is:

1. A device for lifting a bottom side wall (7b) of a tyre (7) in a tyre removing machine (1) where the wheel (5) being processed is positioned with its axis vertical, the device comprising:
a frame (10);
an arm (16) rotatably associated with the frame (10) at a first end (16a) of the arm (16) to rotate around an axis (F) parallel to the wheel (5) axis between an angular rest position and an angular working position;
a supporting element (18) connected to a second end (16b) of the arm (16) and designed to interact with the bottom side wall (7b) of the tyre (7), in order to lift it, when the arm (16) is in the working position,
wherein it comprises an arm (16) rotation stop member (20) configured to hold the arm (16) in place at a certain angular position relative to the frame (10) at least when it is at the angular working position and to impede the arm (16) rotation around said axis (F), wherein the stop member (20) comprises a brake (21).

2. The device according to claim 1, wherein the stop member (20) is adapted to stop the arm (16) at any angular position that it can adopt relative to the frame (10).

3. The device according to claim 1, wherein the brake (21) is mounted integrally on the arm (16).

4. The device according to claim 1, wherein the brake (21) is engageable with a pin (17) on the frame (10).

5. The device according to claim 1, wherein the frame (10) comprises a pin (17) which the first end (16a) of the arm (16) is pivoted to, the brake (21) comprising a clamp (22) placed at least partly around the pin (17) and able to be selectively changed over between an open configuration, where it is disengaged from the pin (17), and a closed configuration, where it is tightened round the pin (17) to prevent the arm (16) from turning.

6. The device according to claim 5, wherein the brake (21) comprises a linear actuator (23) for moving a first jaw (22a) and a second jaw (22b) of the clamp (22) towards each other in order to change the clamp (22) over from the open configuration to the closed configuration and vice versa.

7. The device according to claim 6, wherein the linear actuator comprises a containment body (24) and a plunger (25) that slides inside the containment body (24) along its working axis (D), said containment body (24) extending mainly in a plane (E) transversal to the working axis (D) of the plunger (25).

8. The device according to claim 1, comprising a handgrip lever (29) fixed integrally to the arm (16) and extending away from the arm (16) to allow an operator to move the arm (16) between the angular rest position and the angular working position.

9. The device according to claim 1, comprising movement means (14) for moving the arm (16) and adapted to lift the supporting element (18) from a lowered position to a raised position where it operates on the bottom side wall (7b) of the tyre in order to lift it.

10. The device according to claim 1, wherein the supporting element (18) comprises a disc shaped member (19) shaped in such a way as to form a convex surface (19c) for supporting the tyre (7) and an axis of rotation (C) inclined at an angle to the vertical in such a way that the peripheral portion (19b) of the convex surface on which the tyre (7) rests is substantially horizontal and parallel to the bottom side wall (7b) of the tyre (7).

11. The device according to claim 1, wherein the arm (16) has a telescopic structure.

12. A tyre removing machine (1) adapted to support a wheel (5) positioned with its axis vertical and comprising a device for lifting a bottom side wall (7b) of a tyre (7) of the wheel (5), wherein said device is a device according to claim 1.

13. A method for removing a tyre (7) of a wheel (5) from a corresponding rim, comprising the following steps:
    positioning the wheel on, and fastening it to, a supporting means (2) in such a way that its axis is vertical;
    lifting a bottom side wall (7b) of the tyre (7) using a supporting element (18) connected to an arm (16) rotatably associated with a frame (10) of the tyre removing machine (1) around an axis (F) parallel to the wheel axis to allow a tool to be inserted between a bottom bead (8b) of the tyre and the rim (6);
    turning the wheel (5) about its axis in order to extract the bottom bead (8b) from the rim (6), said lifting step comprising the following sub-steps:
    turning the arm (16) around said axis (F) from a rest position, where the supporting element (18) is in a position of non-interference with respect to the tyre (7), to a working position, where the supporting element (18) has at least one portion under the bottom side wall (7b) of the tyre (7);
    moving the supporting element (18) upwards, wherein the lifting step comprises a further sub-step, intermediate between the turning and movement steps, of stopping the rotation of the arm (16), by actuating a brake (21) operatively active on the arm, when the arm (16) is at the working position in such a way as to prevent angular movements of the arm (16) around said axis (F) until the stopping step is terminated.

14. A device for lifting a bottom side wall (7b) of a tyre (7) in a tyre removing machine (1) where the wheel (5) being processed is positioned with its axis vertical, the device comprising:
    a frame (10);
    an arm (16) rotatably associated with the frame (10) at a first end (16a) of the arm (16) to rotate around an axis (F) parallel to the wheel (5) axis between an angular rest position and an angular working position;
    a supporting element (18) connected to a second end (16b) of the arm (16) and designed to interact with the bottom side wall (7b) of the tyre (7), in order to lift it, when the arm (16) is in the working position;
    an arm (16) rotation stop member (20) configured to hold the arm (16) in place at a certain angular position relative to the frame (10) at least when it is at the angular working position and to impede the arm (16) rotation around said axis (F);
    a handgrip lever (29) fixed integrally to the arm (16) and extending away from the arm (16) to allow an operator to move the arm (16) between the angular rest position and the angular working position.

15. A device for lifting a bottom side wall (7b) of a tyre (7) in a tyre removing machine (1) where the wheel (5) being processed is positioned with its axis vertical, the device comprising:
    a frame (10);
    an arm (16) rotatably associated with the frame (10) at a first end (16a) of the arm (16) to rotate around an axis (F) parallel to the wheel (5) axis between an angular rest position and an angular working position;
    a supporting element (18) connected to a second end (16b) of the arm (16) and designed to interact with the bottom side wall (7b) of the tyre (7), in order to lift it, when the arm (16) is in the working position,
wherein it comprises an arm (16) rotation stop member (20) configured to hold the arm (16) in place at a certain angular position relative to the frame (10) at least when it is at the angular working position and to impede the arm (16) rotation around said axis (F),
wherein the supporting element (18) comprises a disc shaped member (19) shaped in such a way as to form a convex surface (19c) for supporting the tyre (7) and an axis of rotation (C) inclined at an angle to the vertical in such a way that the peripheral portion (19b) of the convex surface on which the tyre (7) rests is substantially horizontal and parallel to the bottom side wall (7b) of the tyre (7).

16. A device for lifting a bottom side wall (7b) of a tyre (7) in a tyre removing machine (1) where the wheel (5) being processed is positioned with its axis vertical, the device comprising:
    a frame (10);
    an arm (16) rotatably associated with the frame (10) at a first end (16a) of the arm (16) to rotate around an axis (F) parallel to the wheel (5) axis between an angular rest position and an angular working position;
    a supporting element (18) connected to a second end (16b) of the arm (16) and designed to interact with the bottom side wall (7b) of the tyre (7), in order to lift it, when the arm (16) is in the working position,
wherein it comprises an arm (16) rotation stop member (20) configured to hold the arm (16) in place at a certain angular position relative to the frame (10) at least when it is at the angular working position and to impede the arm (16) rotation around said axis (F), wherein the arm (16) has a telescopic structure.

* * * * *